United States Patent
Wach et al.

(10) Patent No.: US 7,298,936 B1
(45) Date of Patent: Nov. 20, 2007

(54) FACILE PRODUCTION OF OPTICAL COMMUNICATION ASSEMBLIES AND COMPONENTS

(75) Inventors: Michael L. Wach, Atlanta, GA (US); Dwight Holter, Naples, FL (US)

(73) Assignee: Graywire LLC, Alpharetta, GA (US)

( * ) Notice: Subject to any disclaimer, the term of this patent is extended or adjusted under 35 U.S.C. 154(b) by 1089 days.

(21) Appl. No.: 10/429,166

(22) Filed: May 2, 2003

Related U.S. Application Data

(63) Continuation of application No. 10/010,854, filed on Dec. 4, 2001, now abandoned.

(60) Provisional application No. 60/251,270, filed on Dec. 4, 2000.

(51) Int. Cl.
*G02B 6/12* (2006.01)

(52) U.S. Cl. .............................. 385/14; 385/24; 385/39

(58) Field of Classification Search .................. 385/14, 385/24, 39–52
See application file for complete search history.

(56) References Cited

U.S. PATENT DOCUMENTS

| 4,484,794 A | 11/1984 | Witte | 385/46 |
|---|---|---|---|
| 4,639,074 A | 1/1987 | Murphy | 385/49 |
| 5,091,986 A | 2/1992 | Arii et al. | 385/48 |
| 5,214,730 A * | 5/1993 | Nagasawa et al. | 385/59 |
| 5,265,177 A | 11/1993 | Cho et al. | 385/14 |
| 5,343,544 A | 8/1994 | Boyd et al. | 385/46 |
| 5,838,853 A | 11/1998 | Jinnai et al. | 385/50 |
| 6,467,969 B1 | 10/2002 | Shmulovich | 385/54 |
| 2002/0126953 A1* | 9/2002 | Wach | 385/24 |
| 2004/0052460 A1* | 3/2004 | Wach | 385/39 |

FOREIGN PATENT DOCUMENTS

JP 05313039 A 11/1993

* cited by examiner

*Primary Examiner*—Quyen P Leung

(57) ABSTRACT

A modified fiber interlink forms an optical link between multiple channel waveguides to be mated. Multiple modified fiber interlinks can form optical paths between a multiple fibers and a multi-channel planar waveguide. Modified optical fibers are those fibers that have been shaped or coated to an extent beyond the demands of normal communications optical fibers. In one example, modified fibers are no longer than about two feet in length. For another example, the modified fibers can have either a non-cylindrical end face, a non flat end face, an end face the plane of which is not perpendicular to the longitudinal axis of the waveguide, an end face coated with high density filter, or an identifier on or near an end face.

21 Claims, 7 Drawing Sheets

FACILE PRODUCTION OF OPTICAL COMMUNICATION ASSEMBLIES AND COMPONENTS

RELATED APPLICATION AND PRIORITY CLAIM

The present application claims priority under 35 U.S.C. 119 to the filing date of Dec. 4, 2000 accorded to U.S. Provisional Patent Application Ser. No. 60/251,270. The present application is a continuation of U.S. Nonprovisional application Ser. No. 10/010,854, filed on Dec. 4, 2001 now abandoned and hereby incorporates this parent application by reference and claims priority under 35 U.S.C. § 120.

BACKGROUND OF THE INVENTION

Fiber to fiber and fiber to waveguide linking devices that have been described in the art tend to focus on a substantial length of fiber placed for linkage to another fiber or to a planar waveguide. Prior art connectors and splicing devices typically do not meet the increased demand for minimizing on-line manufacturing time or part replacement/repair time to meet the overall cost requirements for optical communications equipment, particularly in high volume production operations. With the tremendous need for increasing bandwidth, a need exists in the art for increased precision in such linkages and for modifying or eliminating rate-limiting steps in component manufacturing. The increase in overall demand for high quality optical components at modest cost has intensified the importance of achieving high quality consistently and efficiently.

Fiber modification techniques disclosed in U.S. Pat. No. 5,953,477, entitled "Method and Apparatus for Improved Fiber Optic Light Management," filed Mar. 13, 1997, address these challenges. However, the increased capability of separating wavelengths made possible by these advances has further increased the need for precision in other aspects of manufacturing optical assemblies. Cirrex U.S. patent application Ser. No. 09/318,451, entitled, "Optical Assembly with High Performance Filter," filed May 25, 1999, (incorporated herein by reference in its entirety) describes various modifications to fibers. Cirrex U.S. Patent Application Ser. No. 60/213,983 entitled, "Micro Identifier System and Components for Optical Assemblies," filed Jun. 24, 2000 (also incorporated herein by reference in its entirety) describes a system having an identifying mechanism for high performance waveguides that is machine-readable (especially, by optical means, for example, using a laser interference pattern) for quick and accurate recall of information included in the identifying mechanism. Many of the individual components of such optical assemblies are extremely small and technically complex. Differences between component assembly pieces or even differences within individual pieces are difficult to discern. The '983 patent application describes how etching or engraving, for example, of a cladding surface can provide precise and detailed product information, including: the manufacturer, the core and cladding dimensions, compositions, indices of refraction, and other imprinting. Internal identifiers of that type can also be utilized for system integrity/uniformity checks for quality assurance.

Additional details may be important for other types of optical fibers. For example, the end face of one fiber may be intentionally angled so that its face is not uniformly perpendicular to its axis and the axis of a waveguide with which it is to be mated. (See Cirrex U.S. patent application Ser. No. 09/578,777, entitled, "Method and System for Increasing a Number of Information Channels Carried by Optical Waveguides," which is incorporated herein in its entirety by reference.) For a very slight angle, it may be critical to have the end face precisely oriented as it mates with the waveguide. The extent to which the fiber core is off-center or elliptical may also be included in the identifier. The identifier on the fiber and the waveguide provides sufficient information for the mating to be precise.

One advantage of using the peripheral surface of a fiber end face for the identifier is relative space availability. The entire periphery of the end face could be utilized if information space and image clarity are required. Similarly, the probability of that area causing fiber function limitations is low and could be reduced further, for example, by covering disrupted (etched/engraved) surface areas with material that would restore transparency to wavelengths negatively affected without detrimentally affecting the readability of the image. Such factors play a role in determining which identifier process, marking and location to utilize. It also may be critical to high volume production for the information to be read significantly in advance of the mating operation and in some cases even by a different manufacturer. Each improvement in one area exposes additional challenges for the manufacturing processes in other areas, for example, in assuring appropriate, precise fiber to fiber, or fiber to waveguide mating.

SUMMARY OF THE INVENTION

In accordance with the present invention, a modified fiber interlink, typically an optical assembly multi-channel subcomponent, can be created to form the optical link between multiple channel waveguides to be mated. For example, modified fiber interlinks form optical paths between multiple fibers and a multi-channel planar waveguide. Modified optical fibers are those that have been shaped or coated to an extent beyond the demands of normal communications optical fibers. In one example, modified fibers are no longer than about two feet in length and can have either a non-cylindrical end face, a non flat end face, an end face the plane of which is not perpendicular to the longitudinal axis of the waveguide, an end face coated with high density filter, or an identifier on or near an end face. In another example, the modified fiber can include at least one high density filter in the interlink within an interlink channel.

Modified fiber interlinks can be manufactured in a separate operation and thus taken off-line from the main optical assembly manufacturing line. These integral interlinks, in which fibers have been shaped so precisely and/or coated with special filters, can be included in optical assemblies to ultimately provide their beneficial functions without slowing the entire assembly operation. This off-line production can result in a subcomponent that minimizes linkage time in the full component assembly operation. The subcomponent also can decrease the potential for defective linkages or less than optimal performance in both the subcomponent manufacturing operation and the assembly operation.

DETAILED DESCRIPTION OF THE EXEMPLARY EMBODIMENTS

Figure 1:
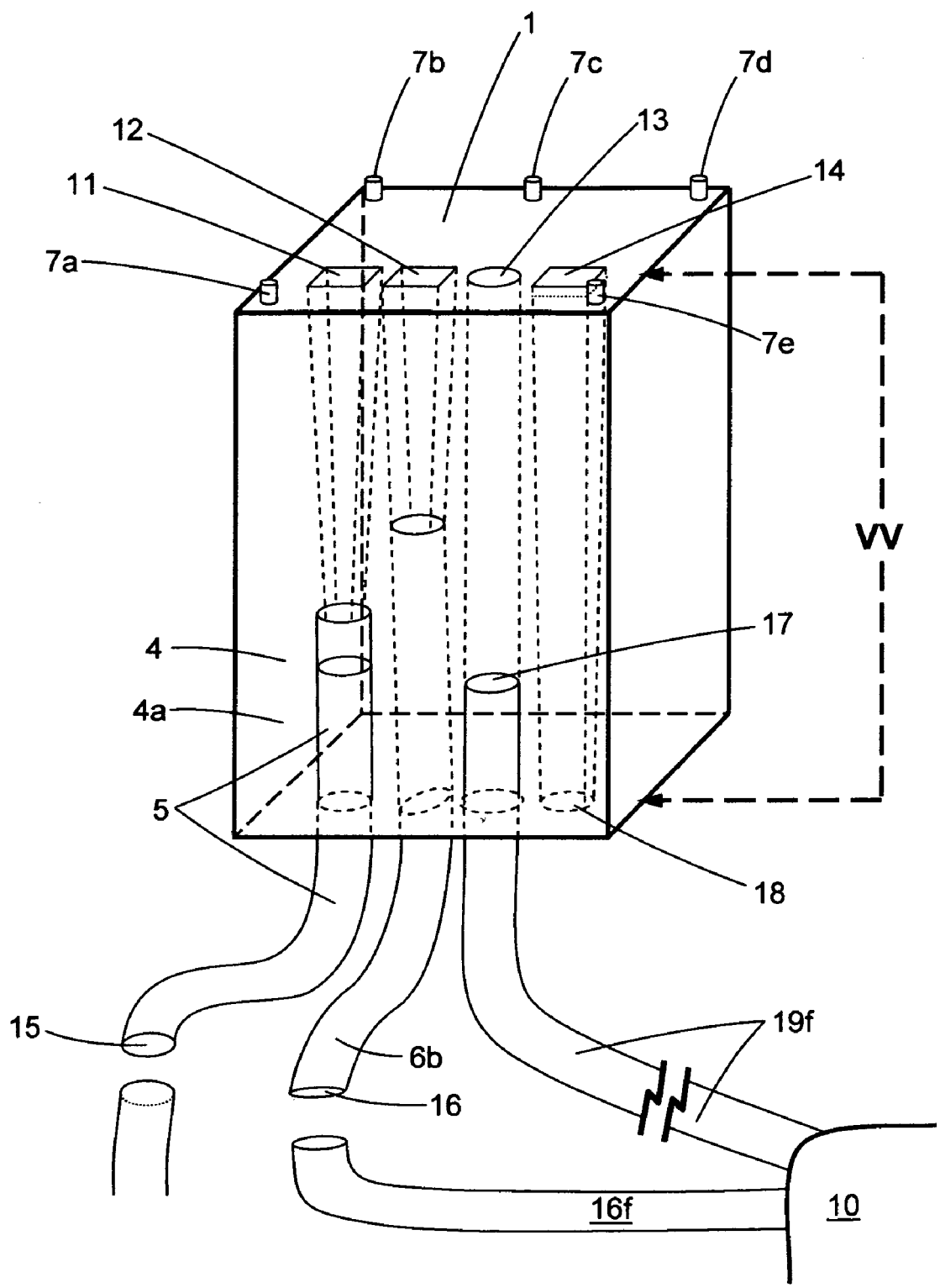
FIG. 1 depicts in exaggerated perspective an interlink having four differently configured waveguides in accordance with an exemplary embodiment of the present invention.
Figure 2:
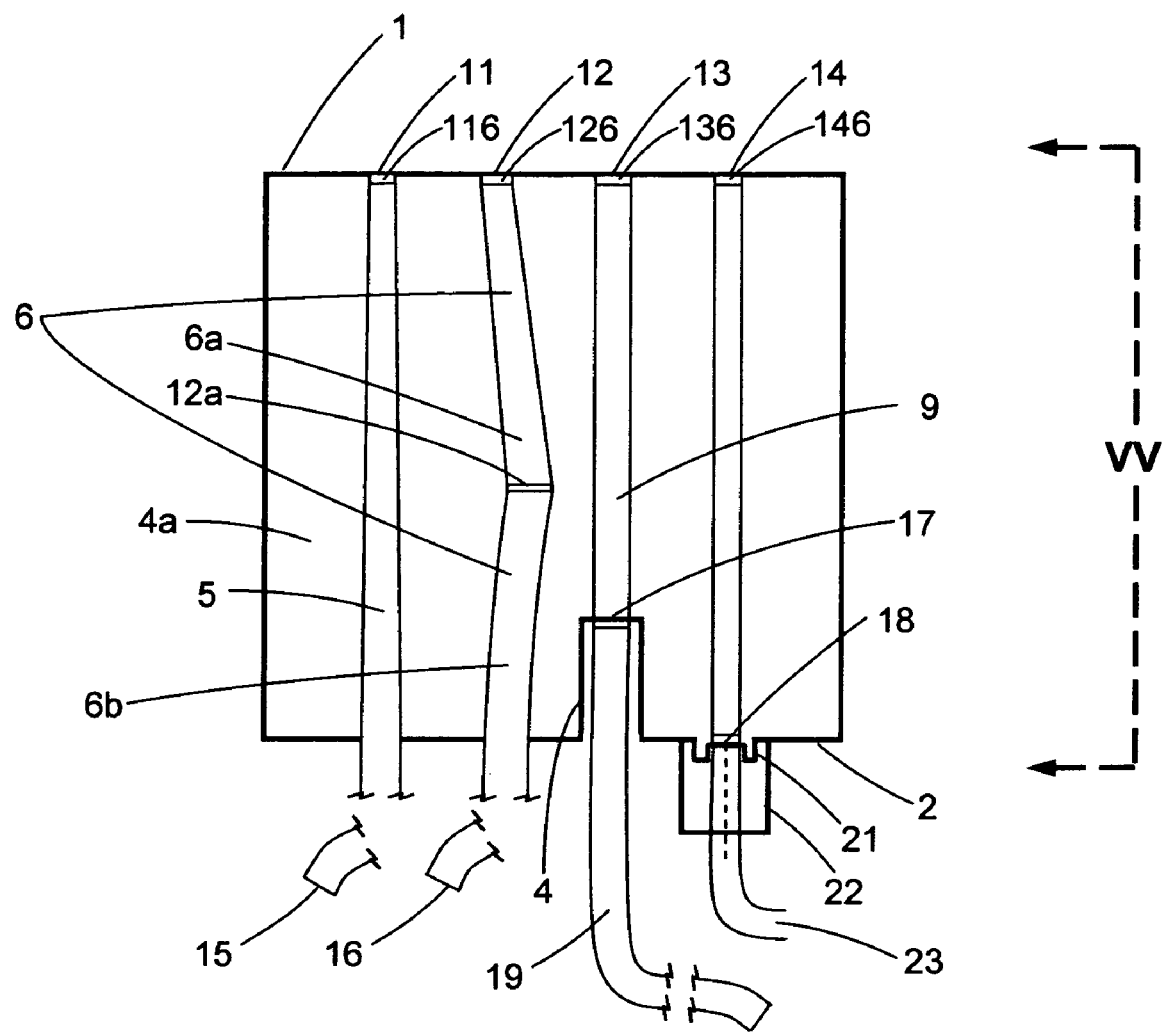
FIG. 2 shows the exemplary interlink of FIG. 1 in cutaway along the AA plane.
Figure 3:
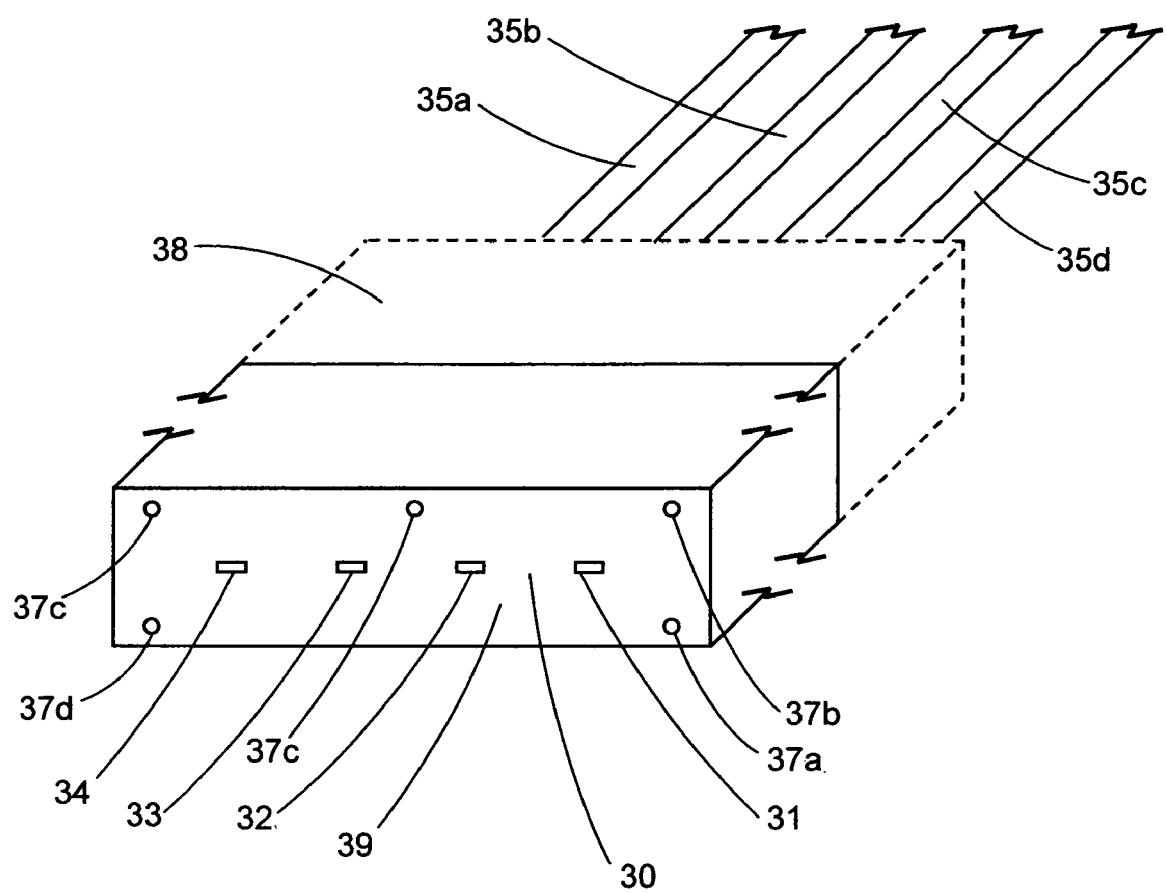
FIG. 3 depicts in exaggerated perspective a planar waveguide configured for mating with the exemplary interlink of FIG. 1.
Figure 7:
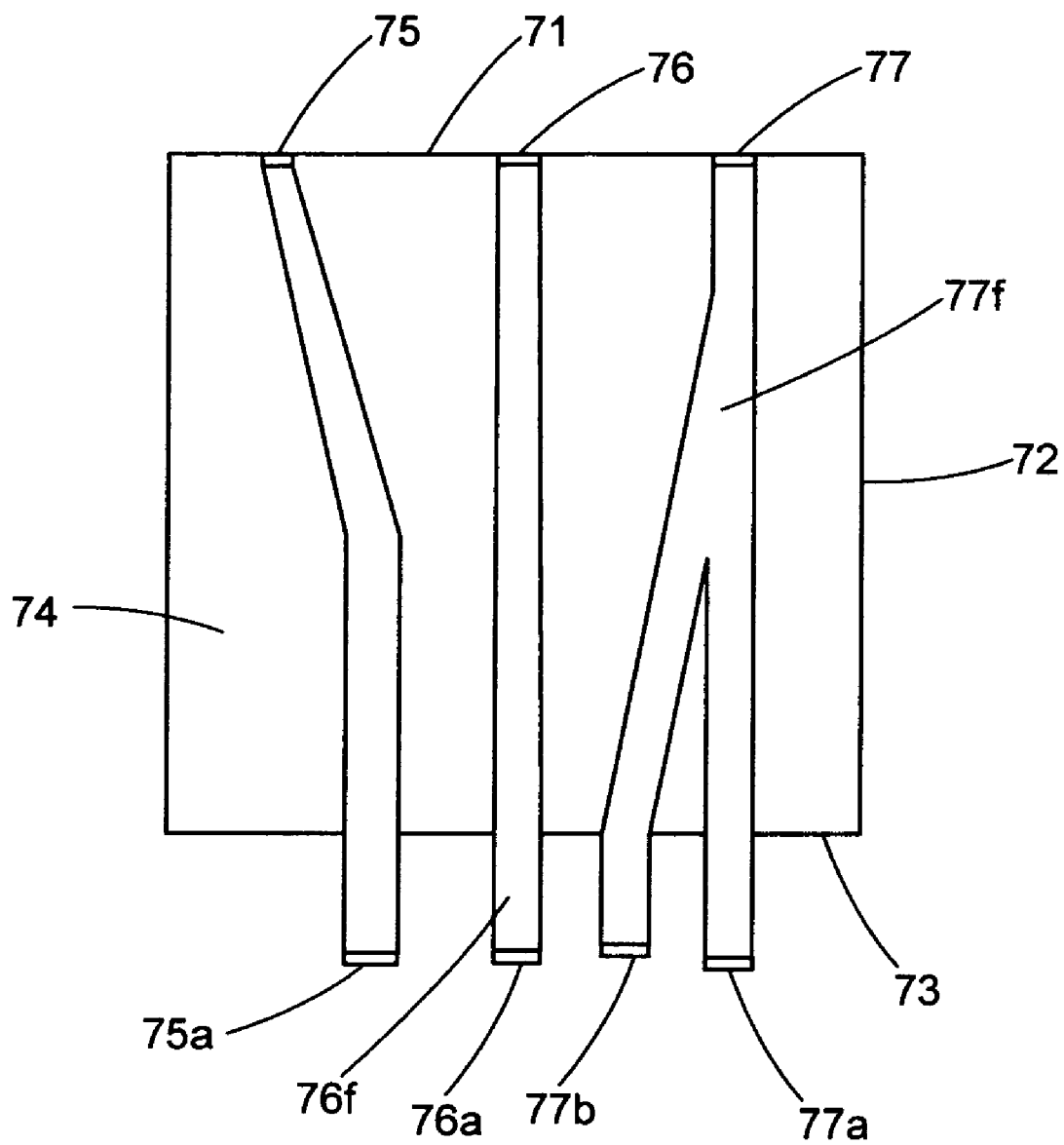
FIG. 7 Illustrates in cutaway additional configurations of waveguides in interlink applications in accordance with an exemplary embodiment of the present invention.

As shown by the exemplary embodiment in FIG. 1, interlink 4 links by providing optical channels, waveguides 5, 6 (an optical fiber formed by fusing fiber segment 6a to fiber segment 6b forming junction 12a), 8, and 9, between a planar waveguide (see planar waveguide unit 30 in FIG. 3) and at least one optical fiber system 10 of which optical fiber 19f is a part. Optical fiber 19f can be mated to waveguide 9, preferably an optical fiber, at interface 17, by inserting fiber 19f in channel or recess 4c of block 4a (See FIG. 2 for additional detail). For example, by using an appropriate epoxy, fiber 19f can be fused to fiber 9 with a filter disposed at the interface 17 therebetween. Optical fiber 18f can be mated to waveguide 8 at interface 18 by inserting fiber 18f into a locking mechanism 22 such as an optical seal housing. The locking mechanism 22 is coupled to face 2 of the interlink 4 by flanges 21 that engage the locking mechanism 22. Disposed at interface 18 can be a filter. Overall, waveguides 5, 6, 8, and 9 of interlink 4 demonstrate various types of optical connections that can exist within interlink 4. It will be understood that the present invention is not limited to the number and types of waveguides shown within interlink 4. For example, FIG. 7 illustrates yet another exemplary embodiment of the type of waveguide configuration that can be disposed within an interlink 4.

Block 4a is rigid, constructed of material opaque to the wavelengths of light expected to be transmitted through the embedded waveguides and light to which the unit is exposed. The material is preferably a plastic that is resistant to thermal expansion and is thermally stable. Fibers 15f, 16f, 18f of the optical fiber system can mate with waveguide ends 15, 16, and 18 respectively of interlink 4. Multi-channel planar optical waveguide unit 30 (see FIG. 3) has a docking surface 39 and ports 31, 32, 33' and 34 optically open to waveguide channels of planar optical waveguide unit 30 which ultimately communicate with waveguides 35a, 35b, 35c and 35d. Face surface region 1 of interlink 4 (FIG. 1) and its positioning pins 7a, 7b, 7c, 7d and 7e mate with docking surface 39 (FIG. 3) and its pin receptacles 37a, 37b, 37c, 37d and 37e, respectively. Ports 11, 12, 13 and 14 of interlink 4 (FIG. 1) mate precisely with ports 31, 32, 33 and 34 respectively (FIG. 3) of planar optical waveguide unit 30. Secure mating for each of the respective waveguide ends can be accomplished by using an appropriate epoxy or other material (e.g. index matching gel) to assure transparent connection. For less than permanent connection, the mating could also be secured by using an index matching gel and a connection system that securely but releasably connects (e.g. using latches) interlink 4 face surface 1 with the docking surface 39 of planar waveguide unit 30. Another alternative that could be used in lieu of or with placement pins and receptacles is a male/female grooving system, as shown in exaggerated perspective in FIG. 3b.

Figure 3A:
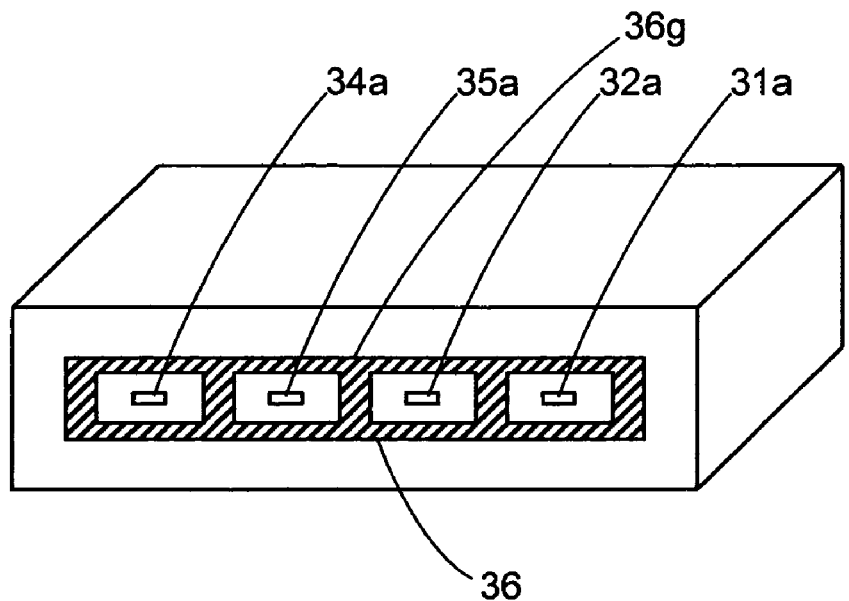
FIG. 3a illustrates in exaggerated perspective a planar waveguide face having a groove surrounding each port for mating with a mating projection surrounding each mating port on a modified fiber interlink in accordance with an exemplary embodiment of the present invention.
Figure 3B:
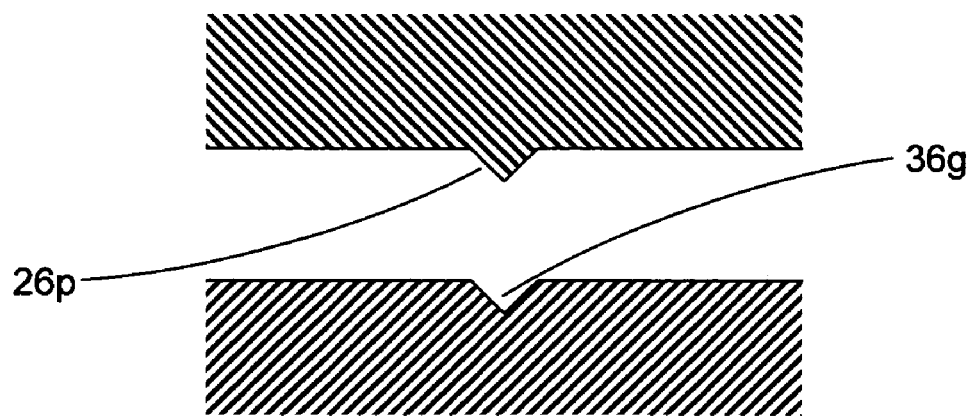
FIG. 3b illustrates a mating projection and a groove for a planar waveguide interlink interface in accordance with an exemplary embodiment of the present invention.

FIG. 3a shows a multi-channel planar waveguide face (docking surface) 36 having groove 36g spaced and completely but separately surrounding each of the ports, 31a, 32a, 33a and 34a. A mating modified fiber interlink would include a precisely dimensioned face surface having shaped, continuous projections 26p that would mate with groove 36g, as illustrated in FIG. 3b. The interlink would also include ports that would mate precisely with ports 31a, 32a, 33a and 34a. As best shown in FIG. 3b, mating projection 26p mates exactly with groove 36g, but the projection could be modified to guide itself to the full depth of groove 36g. The advantage of a grooving system is that it helps to assure that no unintended photon transfer between non mated ports.

In FIG. 1, modified fiber interlink 4 includes optical waveguides of four different configurations for purposes of illustrating the versatility of applicant's invention. Waveguide 5 is a single mode optical fiber which between face 1 and face 2 of unit 4 is embedded in solid opaque block 4a. A significant portion of optical fiber 5 protrudes from face 2 for linking, desirably by fusion at end 15 to a matching optical fiber 15f of optical fiber system 10. The embedded part of optical fiber 5 has an axial cross section that has been modified to transition from a circular cross section at distal end 15 and extending beyond face 2 into block 4a to a rectangular cross section at the proximal end of fiber 5 at port 11. Each of the transitional optical waveguides 5, 6, 9 and 8 has a proximal end at least near face surface region 1. In an exemplary embodiment of this invention waveguides 5, 6, 8, 9 of interlink 4 are each a separate optical fiber, with at least one having on its proximal end an integral high density filter. In another exemplary embodiment, each separate fiber 5, 6, 8 and 9 has a distal end and at least one has a high density filter on its distal end. Such filters are described in detail in U.S. Pat. No. 5,953,477 mentioned above. Optical fibers 5 and 6 of interlink 4 protrude from face surface region 2 and each has a distal end, 15 and 16, respectively, exterior to block 4a. The longitudinal axis of optical fiber 6 is positioned obliquely to face surface region 1. However, high density filter 12b on the proximal end of fiber 6 (shown more clearly in FIG. 2) is preferably parallel to an optical fiber face surface 1 because of the end shaping on both ends of fiber segment 6a and on the juncture end 12a of 6b. It is this sort of precision and flexibility in fusing that highlights the advantages of the interlinks of the exemplary embodiments of the present invention. In another exemplary embodiment, the waveguides of interlink 4 are optical fibers with the proximal end of the fibers 5 (at port 11), 6 (at port 12), 9 (at port 13) and 8 (at port 14) each being slightly recessed from face surface 1. This allows for an appropriate amount of epoxy or other optically transparent material for fusing the fiber ends, for example, to selected waveguide channels in planar waveguide unit 30.

Figure 4:
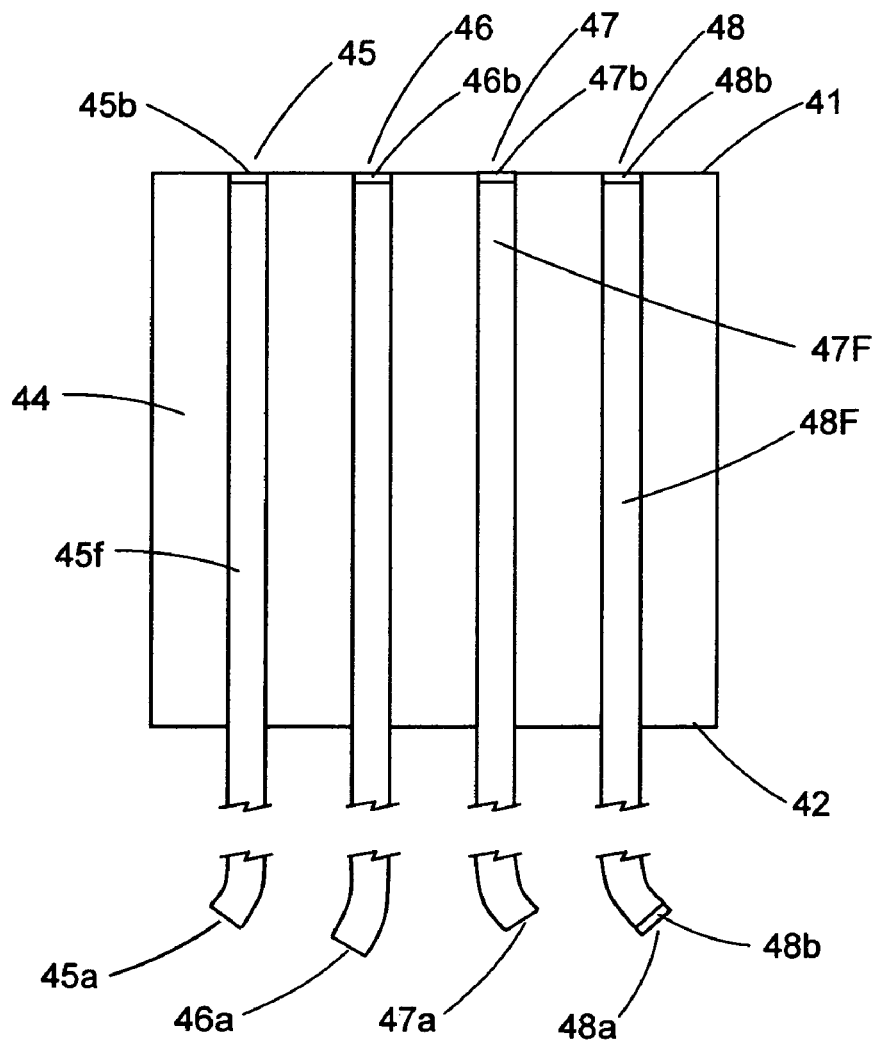
FIG. 4 depicts in cutaway an interlink with cylindrical fibers with high density filters on fiber ends in accordance with an exemplary embodiment of the present invention.

FIG. 4 illustrates a cross-sectional view of an interlink comprising cylindrical fibers with high density filters on fiber ends in accordance with an exemplary embodiment of the invention. Referring now to FIG. 4, an interlink 41 comprises a block 44 and cylindrical fibers 45f, 46f, 47f, and 48f. The block 44 is preferably constructed of a rigid material opaque to the wavelengths of light expected to be transmitted through an embedded portion of the optical fibers 45f, 46f, 47f, and 48f and light to which the unit is exposed. The optical fibers 45f, 46f, 47f, and 48f provide optical channels or waveguides for carrying optical signals. Along face surface 41 of the block 44, the optical fibers 45f, 46f, 47f, and 48f comprise ports 45, 46, 47, and 48, respectively. Filters 45b, 46b, 47b, and 48b, typically high density filters, are positioned along each proximal end face of the optical fibers 45f, 46f, 47f, and 48f, respectively, at the ports 45, 46, 47, and 48 along the face 41. Distal ends 45a, 46a, 47a, and 48a of the optical fibers 45f, 46f, 47f, and 48f, respectively, protrude from a face surface 42 of the interlink 44. One or more of the distal ends 45a, 46a, 47a, and 48a can include an optical filter, such as a high density filter 48a positioned at the distal end 48b. At the face surface 42, a significant portion of each optical fiber 45, 46, 47, and 48 protrudes from the block 44 for linking, preferably by fusion to another optical fiber.

Figure 5:
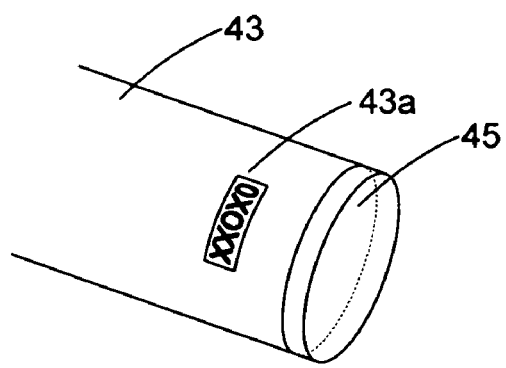
FIG. 5 illustrates a fiber of FIG. 4 having an identifier embedded thereon in accordance with an exemplary embodiment of the present invention.

FIG. 5 illustrates a fiber of FIG. 4 having an identifier embedded adjacent to one end of the fiber in accordance with an exemplary embodiment of the present invention. As shown in FIG. 5, the optical fiber for 45 can comprise an outside surface 43 including an identifier 43a. The identifier 43a is conveniently located proximate to an end of the optical fiber 45 where it can remain visible during operation of the interlink 44. The identifier 43a typically provides identification information to facilitate mating of the optical fiber 45 with another optical fiber or waveguide structure. The identifier 43a preferably includes sufficient space for the incorporation of a micro bar code, magnetic identifier or other identification information. To assist in appropriate alignment in mating of optical assemblies the identifier 43a can identify the dimensions and characteristics of the optical fiber 45. In addition, the core and polarization axes can be identified with respect to the location of the identifier 43a. In the alternative, testing and alignment information can be provided by the identifier 43a to support alignment and testing operations. It will be appreciated that the identifier 43a can be positioned at other locations along the optical fiber 45 so long as the identifier is visible to a user during operations of the interlink 44.

Figure 6:
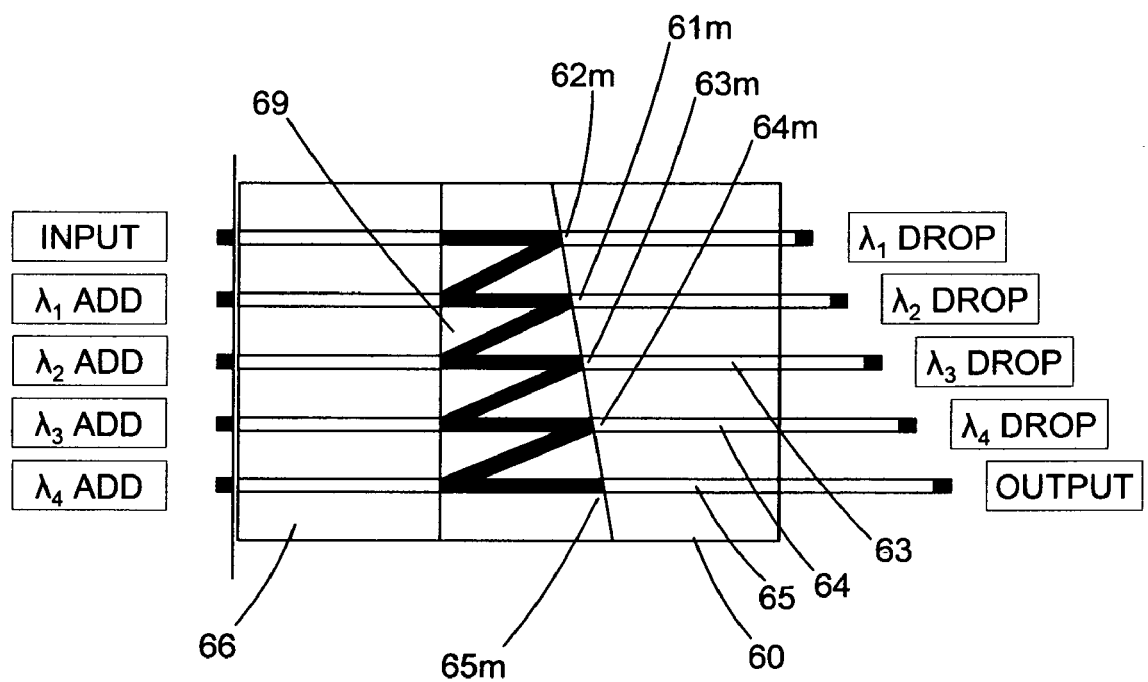
FIG. 6 illustrates in schematic two interlinks used in an add-drop multiplexer application in accordance with an exemplary embodiment of the present invention.

In FIG. 6, a fiber interlink 60 has tapered (oblique) proximal end faces on each of fibers 61, 62, 63, 64 and 65, which mate respectively with mating, tapered ports 61m, 62m, 63m, 64m and 65m of a planar waveguide 69. Similarly, a fiber interlink 66 comprises proximal end faces on optical fibers that mate with opposing ports of the planar waveguide 69. The interlinks 60 and 66 operate in connection with the planar waveguide 69 to support an add-drop multiplier application for adding and dropping optical signals of various wavelengths. The interlink 60 supports the drop function, whereas the interlink 66 supports the add function.

For example, an optical signal input at an input port of the interlink 66 is passed by an optical fiber to the planar waveguide 69. A filter at the port 62m passes wavelength 1 of the optical signal to the interlink 60 and the remaining wavelengths of the optical signal are reflected at the port 62m. In turn, the fiber 61 carries the optical signal having the wavelength 1 through the interlink 60 to the drop application. Similarly, the filter at the port 61m passes wavelength 2 to the optical fiber 62 of the interlink 60 and reflects the remaining wavelengths of the optical signal. In view of the cascading nature of the planar waveguide 69, similar drop functions are completed at the ports 63m, 64m, and 65m to complete the processing of the optical signal by the add-drop multiplexer.

FIG. 7 illustrates a cross-sectional view of waveguides in an interlink in accordance with an exemplary embodiment of a present invention. An interlink 72 comprises waveguides 75f, 76f, and 77f constructed from optical fibers of different configurations to provide channels for carrying optical signals. A portion of the optical fibers or waveguides 75f, 76f, and 77f are embedded within an opaque block 74 comprising material opaque to the wavelengths of light expected to be transmitted through the embedded waveguides and light to which the interlink is exposed. Ports 75, 76, and 77 of the optical fibers 75f, 76f, and 77f are positioned along a face surface 71 of the block 74. As discussed in connection with prior embodiments, the ports 75, 76, and 77 typically represent the proximal ends of the optical fibers 75f, 76f, and 77f. Optical filters can be attached to the proximal ends of the optical fibers 75f, 76f, and 77f and adjacent to the ports 75, 76, and 77. The unembedded portion of the optical fibers 75f, 76f, and 77f extend from a face surface 73 of the block 74. The distal end of each unembedded portion of the optical fibers 75f, 76f, and 77f can include an optical filter such as optical filters 75a, 76a, 77a, and 77b.

In summary, an exemplary embodiment of the present invention provides a modified fiber interlink for linking to and providing optical channels between at least one optical fiber system and at least one multi-channel planar optical waveguide. The waveguide includes a docking surface and ports optically opening on the docking surface to at least some of the optical channels. The interlink has a first face surface for matching the docking surface and selected ports of the planar optical waveguide. This first face surface is configured for mating with the planar optical waveguide and the separate ports thereof and is positioned for optical matching with the selected waveguide ports. The interlink can further include a second face surface positioned in a plane at least approximately parallel to the first face surface. In the alternative, the second face surface can be positioned in a plane oblique to the first face surface.

The interlink can further include at least two modified optical fibers, each having a first fiber end that terminates near the first face surface and is positioned at a different port of the waveguide docking surface. An interlink fiber can be positioned so that it is set at an oblique angle to the first face surface region. An interlink fiber can be shaped to transition the interlink optical channel between a longitudinal length having a larger cross-sectional dimension and a longitudinal length having a smaller cross-sectional dimension. In the alternative, an interlink fiber can be shaped to transition the interlink optical channel between a generally circular cross-section and a rectangular cross-section. One or more of the interlink fibers can be implemented by a shaped optical fiber or by an integral high density filter. This integral high density filter can be positioned at one end of the interlink fiber, typically near the first face surface region.

An interlink fiber can be entirely embedded in fixed position in a rigid opaque material with only its ends exposed, as ports, one of which is for optically mating with an optical fiber from an optical fiber system. In the alternative, an interlink fiber can be partially embedded at one end near the first face surface region in an opaque material with the embedded end exposed as a port for mating with a port in the planar optical waveguide. At least one of the waveguides can include an integral high density filter positioned at one end of the waveguide.

For an alternative embodiment, a modified fiber interlink can link to and provide optical channels between at least one optical fiber system and at least one multi-channel planar optical waveguide having at least one docking surface and ports optically opening on the docking surface to at least some of the optical channels. The interlink comprises a first face surface for matching the docking surface and selected ports of the planar optical waveguide and at least two transitional optical waveguides. Each of the transitional optical waveguides can comprise at least a first transitional optical waveguide end that terminates near the first face surface and is positioned at a separate port in the first face surface.

For yet another exemplary embodiment, an optical sub-assembly comprises a multi-channel optical planar waveguide having at least a first docking surface and a second docking surface. Each surface comprises ports optically opening to waveguide channels. The optical sub-assembly further comprises two modified fiber interlinks. A modified interlink typically comprises a first surface with ports mating with the first docking surface and ports therein and a second surface with ports mating with the second docking surface. The modified fiber interlinks can be placed in fixed relationship to the multi-channel planar optical waveguide.

In view of the foregoing, it will be appreciated that an embodiment of the present invention can provide an optical sub-assembly including at least one multi-channel planar waveguide and at least one modified fiber interlink. An exemplary optical sub-assembly can include (1) a multi-channel planar waveguide having two or more ports to at least two channels, and (2) at least two modified fiber interlinks, each having at least a pair of optical fibers with ports for mating with channels in the planar waveguide. Selected channels of the multi-channel planar waveguide can form communication channels between two modified fiber interlinks.

An exemplary embodiment of the present invention can address the need for precise manufacturing processes. In addition, an exemplary embodiment also can open the door for incorporating improvements and features in conjunction with waveguide-to-waveguide junctures. An exemplary modified fiber interlink system can capture the advantages of fiber shape modifications and new filter technologies without slowing the manufacturing process of components and communications systems benefiting from such advances. The exemplary modified fiber interlink system can be incorporated as a part of high volume manufacturing operations.

What is claimed is:

1. An optical system, comprising:
   an optical circuit comprising:
     a flat surface with a plurality of first waveguide sections extending along the flat surface;
     a first face intersecting each of the first waveguide sections; and
     a hole in the first face, displaced from each of the first waveguide sections; and
   a member, disposed adjacent the optical circuit, comprising:
     a plurality of second waveguide sections;
     a second face intersecting each of the second waveguide sections; and
     a protrusion projecting outward from the second face,
   wherein the first face faces the second face with the protrusion disposed in the hole.

2. The optical system of claim 1, wherein the member comprises an interconnect, and wherein the protrusion and the hole are operative to cooperatively provide alignment between respective ones of the first waveguide sections and respective ones of the second waveguide sections.

3. The optical system of claim 1, wherein the member is essentially rigid and comprises opaque plastic material that seamlessly circumscribes each of the plurality of second waveguide sections, and wherein each of the first waveguide sections and the second waveguide sections is single mode.

4. The optical system of claim 1,
   wherein the optical circuit comprises a plurality of holes in the first face, each displaced from each of the first waveguide sections,
   wherein the member comprises a plurality of alignment pins projecting outward from the second face,
   wherein one of the alignment pins comprises the protrusion, and
   wherein respective ones of the alignment pins are disposed in respective ones of the holes.

5. The optical system of claim 1, further comprising:
   an optical thin film disposed in a recess of the first face or the second face; and
   an identifier that is readable via a laser interference pattern.

6. The optical system of claim 1, further comprising a connection system that releasably connects the optical circuit to the member and that comprises the protrusion and the hole.

7. The optical system of claim 1, wherein the member is an interconnect,
   wherein the optical circuit is a planar waveguide unit that comprises an add-drop multiplexer,
   wherein one of the first waveguide sections comprises a first end face that is essentially coplanar with the first face, and
   wherein one of the second waveguide sections comprises a second end face that is essentially coplanar with the second face.

8. An planar optical waveguide system comprising:
   a solid body that comprises: a first face; a second face; and a third face, the third face extending from the first face to the second face;
   a plurality of waveguide sections running along the third face and extending between the first face and the second face,
   wherein the first face and the second face are oriented at an oblique angle with respect to one another.

9. The system of claim 8, wherein the first face forms an approximately perpendicular angle with each of the plurality of waveguide sections,
   wherein the second face forms a substantially obtuse angle with each of the plurality of waveguide sections, and
   wherein the planar optical waveguide system further comprises a micro barcode, attached to the solid body, that identifies manufacturing information about the planar optical waveguide system.

10. The system of claim 8, wherein a first waveguide interconnect is releasably connected to the first face, and
    wherein a second waveguide interconnect is releasably connected to the second face.

11. A waveguide connection system comprising:
    a first docking surface circumscribing a first end face of a first waveguide;
    a second docking surface circumscribing a second end face of a second waveguide;

an alignment system, operative to align the first waveguide with the second waveguide in response to disposing a protrusion that is attached to the first docking surface in a receptacle that is attached to the second docking surface; and an identifier, encoded with information about at least some component of the waveguide connection system, attached to the waveguide connection system.

12. The waveguide connection system of claim 11, wherein a planar waveguide unit comprises the first waveguide or the second waveguide, wherein the system further comprises an optical filter that is either adhering to the first end face and recessed below the first docking surface or adhering to the second end face and recessed below the second docking surface, and wherein the waveguide connection system further comprises a locking mechanism that secures the protrusion's disposal in the receptacle.

13. The waveguide connection system of claim 11, wherein the identifier is a magnetic identifier and wherein the information comprises manufacturing information about the at least some component.

14. An optical system comprising:

a section of optical fiber having a longitudinal axis and an end face that is disposed at an angle with respect to the longitudinal axis;

an optical filter adhering to the end face;

a waveguide, disposed in a block of rigid material, comprising:
  a first end facing and in optical communication with the end face of the optical fiber;
  a second end opposite the first end; and
  an increase in cross sectional dimension at the second end relative to the first end; and a planar waveguide unit having a port coupled to the first end.

15. The optical system of claim 14, wherein a gap is between the optical filter and the first end face, and wherein the optical filter comprises thin-film layers deposited on the end face.

16. The optical system of claim 14, further comprising a groove supporting optical alignment between components of the optical system, wherein the section of optical fiber comprises a second end face, opposite the first end face, and wherein the optical system further comprises a second section of optical fiber connected to the second end face.

17. The optical system of claim 14, further comprising an identifier disposed on a surface of the optical system, wherein the waveguide is operative to provide a transition between a generally rectangular cross section of the port and a generally circular cross section of the fiber.

18. An optical system comprising:

a body of plastic material, comprising a first end and a second end;

a first section of waveguide extending into the body, from the first end towards the second end;

a second section of waveguide extending into the body, from the second end towards the first end; and a thin film optical filter that is disposed between the first and second sections of waveguide, is optically coupled to the first and second sections of waveguide, and is disposed between the first end and the second end.

19. The optical system of claim 18, wherein the plastic body seamlessly and circumferentially surrounds the first section of waveguide, the second section of waveguide, and the thin film optical filter.

20. The optical system of claim 18, wherein an end face of the first section of waveguide is flush with the first end of the body, wherein the optical system further comprises a planar waveguide unit mated with the first end of the body, and wherein the optical system comprises an optical add drop multiplexer.

21. The optical system of claim 18, wherein the body comprises an essentially flat face running generally parallel to the first and second sections of waveguide, and wherein the first and second sections of waveguide and the thin film optical filter are embedded in the body.

* * * * *